United States Patent [19]

Kee

[11] Patent Number: 4,468,968
[45] Date of Patent: Sep. 4, 1984

[54] METHOD AND ARRANGEMENT FOR PROVIDING INFORMATION TO DEFINE THE VALUES OF A SET OF PARAMETERS WHICH CHARACTERIZE AN ELEMENT

[75] Inventor: David F. Kee, Glenside, Pa.

[73] Assignee: The Singer Company, Stamford, Conn.

[21] Appl. No.: 487,425

[22] Filed: Apr. 21, 1983

[51] Int. Cl.³ .................. G01D 3/04; G01L 19/04
[52] U.S. Cl. .................... 73/708; 73/432 A; 364/558; 364/571
[58] Field of Search .......... 73/1 R, 432 R, 432 A, 73/708; 364/509, 510, 556, 558, 571

[56] References Cited

U.S. PATENT DOCUMENTS

| | | | |
|---|---|---|---|
| 3,720,813 | 3/1973 | Badessa | 73/1 R |
| 4,080,658 | 3/1978 | Scott et al. | 73/1 R |
| 4,084,248 | 4/1978 | Scott | 73/1 R |
| 4,195,349 | 3/1980 | Balkani | 364/571 |
| 4,418,392 | 11/1983 | Hata | 364/571 |
| 4,443,117 | 4/1984 | Muramoto | 374/1 |
| 4,444,054 | 4/1984 | Schaff | 73/708 |
| 4,446,527 | 5/1984 | Runyan | 364/558 |

Primary Examiner—S. Clement Swisher
Attorney, Agent, or Firm—David L. Davis; Robert E. Smith; Edward L. Bell

[57] ABSTRACT

An electrical transducer connected to a computer-based system is temperature compensated by providing an assembly including the transducer, which assembly further includes a temperature transducer and a coding element providing a signal which is decoded by the computer to specify the zero shifts and sensitivity changes of the transducer at high and low temperature extremes.

11 Claims, 2 Drawing Figures

| % ERROR BEFORE CORRECTION | % AFTER 2 LEVEL CORRECTION | | % AFTER 3 LEVEL CORRECTION | | % AFTER 4 LEVEL CORRECTION | | % AFTER 5 LEVEL CORRECTION | |
|---|---|---|---|---|---|---|---|---|
| 1.0 | | 0.5 | | 0.33 | | 0.25 | | 0.2 |
| 0.9 | | 0.4 | | 0.23 | | 0.15 | | 0.1 |
| 0.8 | | 0.3 | | 0.13 | -0.75 | 0.05 | -0.8 | 0. |
| 0.7 | | 0.2 | -0.67 | -0.03 | | -0.05 | | -0.1 |
| 0.6 | | 0.1 | | -0.07 | | -0.15 | | 0.2 |
| 0.5 | -0.5 | 0. | | -0.17 | | 0.25 | | 0.1 |
| 0.4 | | -0.1 | | -0.27 | | 0.15 | -0.4 | 0. |
| 0.3 | | -0.2 | | 0.3 | | 0.05 | | -0.1 |
| 0.2 | | -0.3 | | 0.2 | -0.25 | -0.05 | | 0.2 |
| 0.1 | | -0.4 | | 0.1 | | -0.15 | | 0.1 |
| 0. | | 0.5 | 0. | 0. | | -0.25 | 0. | 0. |
| -0.1 | | 0.4 | | -0.1 | | 0.15 | | -0.1 |
| -0.2 | | 0.3 | | -0.2 | | 0.05 | | -0.2 |
| -0.3 | | 0.2 | | -0.3 | +0.25 | -0.05 | | 0.1 |
| -0.4 | | 0.1 | | 0.27 | | -0.15 | +0.4 | 0. |
| -0.5 | +0.5 | 0. | | 0.17 | | -0.25 | | -0.1 |
| -0.6 | | -0.1 | | 0.07 | | 0.15 | | -0.2 |
| -0.7 | | -0.2 | +0.67 | -0.03 | | 0.05 | | 0.1 |
| -0.8 | | -0.3 | | -0.13 | +0.75 | -0.05 | +0.8 | 0. |
| -0.9 | | -0.4 | | -0.23 | | -0.15 | | -0.1 |
| -1.0 | | -0.5 | | -0.33 | | -0.25 | | -0.2 |

METHOD AND ARRANGEMENT FOR PROVIDING INFORMATION TO DEFINE THE VALUES OF A SET OF PARAMETERS WHICH CHARACTERIZE AN ELEMENT

DESCRIPTION

BACKGROUND OF THE INVENTION

This invention relates to an improved method and arrangement for efficiently providing information to characterize an element by coding the values of a defined set of parameters for that element.

The accurate measurement of physical quantities such as pressure or flow are difficult enough under room temperature conditions. When these measurements are made in the outdoor environment, widely varying temperatures introduce errors because the output of typical transducers (devices which provide a usable output in response to a specific physical quality) unavoidably shifts slightly with changes in ambient temperature. For temperature transducers, this change is desired (indeed, often maximized). But for other transducers, this shift in transducer output owing to changes in ambient temperature is unwanted. This characteristic is referred to as the thermal shift. If given a numeric valve, the amount of shift is listed as the thermal coefficient (e.g., 0.02% change in output per degree of temperature).

Further, the thermal shift usually affects two different transducer characteristics—the zero output (the transducer output when the physical quantity is zero) and the sensitivity (the ratio of the change in transducer output to a change in the value of the physical quantity). Thus, thermal shifts are usually referred to separately as either thermal zero shifts or thermal sensitivity shifts, and are typically the result of several independent changes with temperature occurring in the transducer.

Even very expensive electrical transducers can be several percent in error at extremes of outdoor ambient temperatures of −40° F. to +140° F. The general practice of electrical transducer suppliers for improving accuracy is to use trimming components in a dedicated circuit to provide temperature compensation of the electrical output. Thus, a dedicated circuit assembly must be provided and fine tuned to the individual transducer characteristics. The cost of the temperature compensated electrical transducer increases accordingly. As a rule of thumb, to reduce the error by one half, the cost is likely to rise by a factor of four.

In applications where the output of an electrical transducer is the input to some form of digital computer-based system, compensation by internal software within the computer becomes practical. Temperature compensation by software is more cost effective than compensation by hardware in high accuracy applications. However, such cost effectiveness is severely degraded if there are unique compensation characterization numbers for each individual electrical transducer and the unique numbers have to be entered into the computer either manually by keyboard or by providing dedicated digital input circuitry with each transducer along with a digital input port in the system.

It is therefore an object of the present invention to provide a method and arrangement for providing information to a computer-based system to characterize an input element connected to the system.

It is another object of this invention to provide such an arrangement wherein the element is precalibrated so that such elements are interchangeable for connection to the system without any further calibration.

SUMMARY OF THE INVENTION

The foregoing and additional objects are attained in accordance with the principles of this invention by providing a method, and an arrangement operating in accordance therewith, of inputting to a microcomputer or the like variable input data which defines a value for each of a plurality of parameters so as to characterize an element. Thus, in accordance with the method, the parameters are grouped such that there is provided a plurality of unique combinations each of which defines a combination of possible specific values for each of the parameters. An electrical property, such as a voltage value, corresponding to each of the unique combinations is assigned. For the particular element, a voltage supply is provided having an output coupled to the microcomputer and the voltage supply is adjusted so the voltage level on the output equals the assigned voltage value corresponding to the combination of parametric values which characterizes that element.

In accordance with an aspect of this invention, a temperature compensated pressure transducer assembly adapted for connection to a computer-based system comprises a pressure transducer, a temperature transducer, and means for providing a voltage having a coded value which can be decoded by the computer to characterize the thermal zero shift of the pressure transducer at a first temperature and at a second temperature and the thermal sensitivity change of the pressure transducer at the first temperature and at the second temperature.

BRIED DESCRIPTION OF THE DRAWINGS

The foregoing will be more readily apparent upon reading the following description in conjunction with the drawings wherein:

FIG. 1 is a general block diagram showing the connection of a temperature compensated pressure transducer, constructed in accordance with the principles of this invention, to an electronic instrument for accurate pressure measurement; and FIG. 2 is a table useful for illustrating a digital correction technique which may be utilized for the transducer illustrated in FIG. 1.

DETAILED DESCRIPTION

Figures 1, 2:
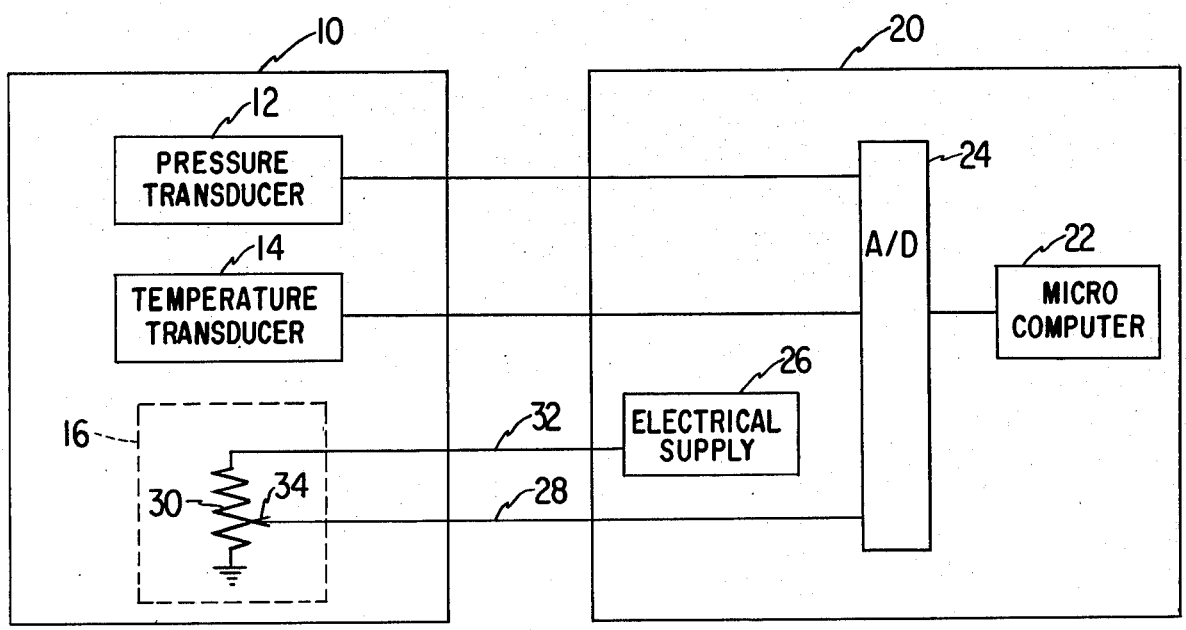

FIG. 1 illustrates a temperature compensated pressure transducer assembly 10, constructed in accordance with the principles of this invention, connected to an electronic microprocessor based instrument 20 utilized to accurately measure pressure. The assembly 10 includes a pressure transducer 12, a temperature transducer 14, and a coding element 16, shown as a variable potentiometer. The instrument 20 includes a programmed microcomputer 22, or the like, analog to digital converter channels 24 and a voltage supply 26. For clarity, the sensing of the temperature is shown to be accomplished by a separate transducer 14, but it is understood that the temperature of the pressure transducer 12 may be sensed as a change in another variable of the pressure transducer element itself, such a change in resistance, capacitance, inductance, frequency, etc. In accordance with the principles of this invention, the instrument 20 is arranged to correct the signal from the pressure transducer 12 to compensate for the temperature of the pressure transducer sensed by the temperature transducer 14.

FIG. 2 illustrates a correction technique which may be utilized in accordance with the method and arrangement according to the principles of this invention. Column 1 of the table of FIG. 2 lists an exemplary plus and minus one percent error that may occur in the output of a transducer. For example, in the case of a pressure transducer, at −40° F. for zero pressure, the output signal may have an error anywhere within the range of ±1.0 percent of full scale. Thus, one can test a transducer and find its thermal zero shift at a given temperature. The remaining columns in FIG. 2 show the percent error after different levels of correction. Thus, the second column illustrates the percent error after a two level correction is made. For this type of correction, 0.5 percent is either added to or subtracted from the transducer reading, depending on what the measured percent error is. Thus, if the measured percent error is positive, 0.5 percent is subtracted from the measured value, and if the measured percent error is zero or negative, 0.5 percent is added to the measured value. This results in a reduction of the percent error from ±1.0 percent to ±0.5 percent, as may be seen from the second column of FIG. 2. Similarly, the remaining columns in FIG. 2 show the results of three, four and five level corrections. It is seen that the greater the number of levels, the more precise the correction can be.

Transducers have different thermal zero shifts at high and low temperatures. They also have different thermal sensitivity changes at the temperature extremes. In accordance with the principles of this invention, the coding element 16 is utilized to provide four pieces of information to characterize the electrical transducer 12. These four pieces of information are:

(1) zero shift at low temperature;
(2) zero shift at high temperature;
(3) sensitivity change at low temperature; and
(4) sensitivity change at high temperature.

For reasons which will become apparent from the following discussion, the zero shifts are coded for a four level correction and the sensitivity changes are coded for a five level correction. Thus, since there can be four zero shift corrections at low temperature and four zero shift corrections at high temperature, there are a total of sixteen possible combinations of zero shift corrections. Similarly, there are a total of twenty-five possible combinations of sensitivity changes.

Illustratively, the digital converter 24 can read an input voltage in the range from 0 to 1.999 volts. Accordingly, the coding element 16 is arranged to provide a voltage input to the microcomputer 22, through the digital converter 24, which voltage acts as a signature signal for the pressure transducer 12 to specify the set of values for the parameters (i.e., the zero shifts and sensitivity changes) which characterize the transducer 12. Furthermore, these parameters have a defined order so that when the signature signal voltage value is expressed as a decimal number, the places of that decimal number correspond to the defined order of the parameters. Accordingly, the first two digits of the decimal equivalent of the voltage on the lead 28 from the coding element 16 are utilized for the sixteen combinations of zero shifts, i.e., the first two digits of the decimally expressed voltage on the line 28 can assume the values from 0.1 to 1.6. Similarly, the twenty-five possible combinations of sensitivity changes are coded with the last two digits of the decimally expressed value of the voltage on the line 28.

To provide the signature signal voltage on the line 28, in accordance with the principles of this invention, the coding element 16 comprises a voltage divider. In particular, the voltage divider is a variable potentiometer 30. The potentiometer 30 is a temperature stable element so that it does not have to be temperature compensated. The voltage supply 26 provides at its output on the lead 32 an output of 2.0 volts. When the pressure transducer assembly 10 is assembled at the factory, the characterizing parameters of the pressure transducer, as defined above, are measured and the tap 34 of the potentiometer 30 is set to provide the appropriate signature signal voltage on the lead 28 when 2.0 volts is applied to the lead 32. For decoding purposes, since the last digit of the signature signal voltage may be uncertain, if the last digit is converted by the digital convverter 24 as either 0, 1, 2 or 3, the microcomputer 22 groups these as a first single digit code. Similarly, when the last digit is recognized by the microcomputer 22 as 4, 5, or 6, this is treated as a second single digit code. Lastly, if the last digit recognized by the microcomputer 22 is a 7, 8 or 9, this is treated as a third single digit code. Thus, since the last digit has three possible "values" and the next to last digit has ten possible values, there are thirty possible combinations of the last two digits recognizable by the microcomputer 22. Of these thirty possible combinations, twenty-five are utilized to characterize the sensitivity changes of the pressure transducer 12 at the high and low temperature extremes.

Thus, when the microcomputer 22 is called upon to utilize a pressure reading from the pressure transducer 12, it reads the value of the signature signal voltage on the lead 28 and from this value it determines the zero shifts and sensitivity changes at the high and low temperature extremes for the pressure transducer 12. Utilizing conventional curve fitting techniques, the microcomputer 22 then calculates the zero shift and sensitivity change at any temperature between those extremes. Accordingly, by knowing the actual temperature of the pressure transducer 12, as determined by the output of the temperature transducer 14, the microcomputer 22 can determine the zero shift and sensitivity change for the pressure transducer 12 and correct the reading accordingly. Looking at the table of FIG. 2, it is seen that using a four level correction for zero shift and a five level correction for sensitivity the pressure transducer error can be reduced to ±0.45 percent, from a possible uncorrected 2 percent error.

It is thus seen that the pressure transucer assembly 10 constructed in accordance with the principles of this invention is, when connected to an appropriately programmed microcomputer or the like within a pressure measuring instrument, a totally calibrated temperature compensated device. This transducer assembly is highly advantageous because it is totally interchangable with other like devices without the necessity of specially inputting data to the microcomputer so that if the transducer assembly 10 fails, it is easily replaced in the field and the computer-based system automatically reads the new code information. Another advantage of the described assembly is that its cost is greatly reduced over prior temperature compensated pressure transducer assemblies.

Although the pressure transducer assembly 10 has been described as including a potentiometer as the coding element, it is contemplated that other elements may be utilized to effect the same result. The coding element should provide a signal in the same electrical form (e.g., voltage, current, frequency, etc.) as that provided by the transducer. Additionally, increased accuracy can be achieved with additional encoding, if one is willing to accept the expense.

Accordingly, there has been disclosed an improved method and arrangement for providing information to characterize an element. It is understood that the above described embodiment is merely illustrative of the application of the principles of this invention. Numerous other embodiments may be devised by those skilled in the arts without departing from the spirit and scope of the invention, as defined by the appended claims.

I claim:

1. A method of inputting to a microcomputer or the like input data which defines a value for each of a plurality of parameters so as to characterize an element, comprising the steps of:
grouping the parameters such that there is provided a plurality of unique combinations each of which defines a combination of possible specific values for each of said parameters;
assigning an electrical value corresponding to each of said unique combinations;
providing for said element a voltage supply having an output coupled to said microcomputer; and
adjusting said voltage supply so that the electrical value of said output equals the assigned electrical value corresponding to the combination of parameter values which characterizes said element.

2. In combination with an element which is characterized by a set of values for a plurality of defined parameters, an arrangement for providing a signature signal for said element to specify said set of values, said arrangement comprising:
a voltage supply; and
coding means coupled to said voltage supply for providing said signature signal, said signature signal having a value which directly corresponds to said set of values for said element.

3. The arrangement according to claim 2 wherein said plurality of parameters have a defined order and when said signature signal value is expressed as a decimal number, the places of said decimal number correspond to the defined order of said plurality of parameters.

4. The arrangement according to claim 2 wherein said coding means comprises a voltage divider.

5. The arrangement according to claim 4 wherein said voltage divider is a variable potentiometer individually set in accordance with the set of values for said element.

6. The arrangement according to claim 5 wherein said plurality of parameters have a defined order and when said signature signal value is expressed as a decimal number, the places of said decimal number correspond to the defined order of said plurality of parameters, said arrangement further including an analog to digital converter coupled to the output of said coding means.

7. The arrangement according to claim 2 wherein:
(a) said element is a pressure transducer;
(b) said plurality of defined parameters includes:
(i) the zero shift of said transducer at a first temperature;
(ii) the zero shift of said transducer at a second temperature;
(iii) the sensitivity change of said transducer at said first temperature; and
(iv) the sensitivity change of said transducer at said second temperature; and
(c) when said signature signal value is expressed as a four digit decimal number, a first group of two of said digits corresponds to combinations of zero shift values at said first and second temperatures and a second group of the other two of said digits corresponds to combinations of said sensitivity change values at said first and second temperatures.

8. The arrangement according to claim 7 wherein there are four possible zero shifts at each of said first and second temperatures and five possible sensitivity changes at each of said first and second temperatures so that said first group of digits can assume one of sixteen possible values and said second group of digits can assume one of twenty-five possible values.

9. A temperature compensated pressure transducer assembly adapted for connection to a computer-based system comprising:
a pressure transducer;
a temperature transducer; and
means for providing a voltage having a coded value which can be decoded by the computer to characterize the zero shift of said pressure transducer at a first temperature and at a second temperature and the sensitivity change of said presure transducer at said first temperature and at said second temperature.

10. The assembly according to claim 9 wherein said voltage providing means includes a variable potentiometer.

11. The assembly according to claim 9 wherein when said coded value of said voltage is expressed as a four digit decimal number, a first group of two of said digits corresponds to combinations of zero shift values at said first and second temperatures and a second group of the other two of said digits corresponds to combinations of sensitivity change values at said first and second temperatures.

* * * * *